Patented Jan. 8, 1935

1,987,553

UNITED STATES PATENT OFFICE 1,987,553

EXPANSION JOINT

Albert C. Fischer, Chicago, Ill., assignor to The Philip Carey Manufacturing Company, a corporation of Ohio No Drawing. Application January 10, 1930, Serial No. 420,010

4 Claims. (Cl. 94—18)

This invention relates to constructional material, preferably preformed into strips, and particularly pertains to constructional composition strips which are adapted to be employed as cushion elements for separating or underlying more rigid elements.

The invention typifies an expansion joint strip which is employed in building or paving constructions to separate and space rigid elements and to allow for their contraction and expansion under varying climatic conditions. The strip is especially suited for separating concrete or other rigid elements in a paving construction.

Heretofore it has been the practice to prepare expansion joints primarily from bituminous materials or bituminous materials in which some fiber is incorporated. Bituminous materials are subject to successive oozing, and are of a different color than concrete which is principally employed in a paving construction.

My invention relates to constructional material or strips composed of clays, shales, infusorial earth, fuller's earth, and in fact any earthy substance which readily adapts itself to a putty-like condition when mixed with oil. A bluish gray clay is preferred because of its resemblance to the concrete, and this is mixed with suitable vegetable, mineral or animal oils to make a ductile and workable mass.

More specifically described the invention relates to a constructional material comprising a mixture of a suitable clayey substance with oil, such as, cotton-seed oil, castor oil, fish oil, or the like, preferably those slow drying or nondrying, a suitable mixture to be produced by incorporating seventy-five (75%) per cent clay, preferably prepared in a ground, pulverized state, and twenty-five (25%) per cent oil. However, a stiffer material can be prepared from a mixture of eighty-five (85%) per cent clay and fifteen (15%) per cent oil, or a mixture may even be prepared containing ninety-five (95%) per cent clay and five (5%) per cent oil, depending entirely upon the nature of the oil and the degree of plasticity required in the mixture. After a thorough mixing of these ingredients the bulk material may be pressed between suitable rolls and formed into sheets to any desired thickness, and may then be cut in strips by the proper slitting machinery, all of which is now on the market, being used for pressing and slitting materials prepared from bituminous mixtures.

The structure may be greatly assisted by incorporating therein fibrous material in various quantities, and with this fibrous material may be mixed various ingredients, such as, oil or soap, in fact anything which will aid in the toughness of the material, or the materials may be incorporated dry. The fibrous material may consist of excelsior, broom corn, straw, hair, asbestos fiber and vegetable fibers, among which are the wood fibers and other animal fibers which may be suitable for the purpose, the purpose of the fibrous matter being primarily to bind the clay together, making it easier to handle the clay sheets without breaking.

The resulting sheet may advantageously be coated or faced with a layer of bituminous material, or bituminous material and fiber, which will enable it to adhere to the concrete and impart toughness thereto.

I find that the oil mixed with the clay makes the mass waterproof and also plastic, and that fibrous matter imparts strength to the mass and makes it easier to handle without breakage. It is preferable that the clay be ground to a very fine consistency before incorporating the oil with the clay.

The advantage of my invention results in economy of manufacture, adaptability to a wider use of the product, and a closer resemblance to concrete with which it is previously used.

It will be understood that the invention is not limited to the details of construction herein described. The earthy material, as well as the oil and fiber, may be changed in kind, as well as in proportion, without departing from the spirit of the invention.

I claim:

1. A preformed expansion joint comprising a tough, plastic mass having a major constituent composed of earthy material treated with a non-drying oil.

2. A preformed expansion joint comprising a tough, plastic mass consisting of blue-gray clay treated with a non-drying oil.

3. A preformed expansion joint comprising a tough, plastic mass composed mainly of earthy material treated with non-drying oil and having relatively long fibres incorporated in the earthy material to bind the same into a unit mass.

4. A preformed expansion joint comprising a tough, plastic mass composed mainly of earthy material treated with non-drying oil and having its sides provided with a layer of waterproofing material, said waterproofing material including fibrous elements.

ALBERT C. FISCHER.